US 8,385,201 B2

(12) United States Patent
Cohen et al.

(10) Patent No.: US 8,385,201 B2
(45) Date of Patent: *Feb. 26, 2013

(54) END-SYSTEM DYNAMIC RATE LIMITING OF BACKGROUND TRAFFIC

(75) Inventors: Bram Cohen, Mill Valley, CA (US); David Harrison, San Francisco, CA (US); Gregory Hazel, Berkeley, CA (US)

(73) Assignee: BitTorrent, Inc., San Francisco, CA (US)

( * ) Notice: Subject to any disclaimer, the term of this patent is extended or adjusted under 35 U.S.C. 154(b) by 207 days.

This patent is subject to a terminal disclaimer.

(21) Appl. No.: 12/732,264

(22) Filed: Mar. 26, 2010

(65) Prior Publication Data
US 2010/0284276 A1 Nov. 11, 2010

Related U.S. Application Data

(63) Continuation of application No. 11/740,918, filed on Apr. 26, 2007, now Pat. No. 7,706,260.

(60) Provisional application No. 60/745,736, filed on Apr. 26, 2006.

(51) Int. Cl.
*G01R 31/08* (2006.01)
(52) U.S. Cl. ........ 370/234; 370/233; 370/235; 370/248; 370/392; 370/395.31; 709/224; 709/225; 709/226
(58) Field of Classification Search .............. 370/229, 370/230, 231, 232, 233, 234, 235, 248, 389, 370/392, 395.31; 709/223–226
See application file for complete search history.

(56) References Cited

U.S. PATENT DOCUMENTS

| 6,741,555 | B1 * | 5/2004 | Li et al. .......................... 370/229 |
| 6,760,774 | B1 | 7/2004 | Soumiya et al. |
| 6,870,827 | B1 * | 3/2005 | Voit et al. ....................... 370/352 |
| 7,174,385 | B2 * | 2/2007 | Li .................................. 709/231 |
| 7,440,401 | B2 | 10/2008 | Kang |
| 7,706,260 | B2 * | 4/2010 | Cohen et al. ................... 370/229 |
| 2001/0037311 | A1 | 11/2001 | McCoy et al. |
| 2002/0099844 | A1 * | 7/2002 | Baumann et al. ............. 709/232 |
| 2004/0143603 | A1 | 7/2004 | Kaufmann et al. |
| 2005/0249226 | A1 | 11/2005 | Kang |
| 2005/0267945 | A1 | 12/2005 | Cohen et al. |
| 2006/0122898 | A1 | 6/2006 | Andersen et al. |
| 2007/0174471 | A1 | 7/2007 | Van Rossum |
| 2008/0155120 | A1 | 6/2008 | Argawal et al. |
| 2008/0189429 | A1 | 8/2008 | DaCosta |
| 2010/0142376 | A1 | 6/2010 | Lou et al. |

OTHER PUBLICATIONS

Carter, R. et al., "Measuring Bottleneck Link Speed in Packet Switched Networks," *Performace Evaluation*, 1996, pp. 297-319.
Downey, A., "Using Pathchar to Estimate Internet Link Characteristics," in *Proceedings of ACM SOGCOMM '99*, Aug. 1999, pp. 241-250, Boston, MA, USA.

(Continued)

*Primary Examiner* — Christopher Grey
(74) *Attorney, Agent, or Firm* — Fenwick & West LLP

(57) ABSTRACT

Dynamic rate limiting of background traffic to alleviate congestion in the access network is enabled. ICMP echo round-trip times and ICMP losses to a nearby node outside the local area and just beyond the divergence in end-to-end paths are measured, allowing unambiguous discrimination of nearby from distant congestion points. Using round-trip time samples, either short-run delay or short-run variance in delay can be measured to estimate congestion. When combined with an appropriate control law, background traffic can be rapidly reduced to allow interactive traffic to traverse unhindered through the access network. The described system and methods can be implemented in the application-layer and without any additional support from the network.

21 Claims, 4 Drawing Sheets

OTHER PUBLICATIONS

Jacobson, V., "Pathchar—A Tool to Infer Characteristics of Internet Paths," *Network Research Group, Lawrence Berkeley National Laboratory, Mathematical Sciences Research Institute*, Apr. 21, 1997, Berkeley, CA, USA, twenty-one pages. [Online] [Retrieved Nov. 29, 2010] Retrieved from the Internet <URL:ftp://ftp.ee.lbl.gov/pathchar/msri-talk.pdf.>.

* cited by examiner

END-SYSTEM DYNAMIC RATE LIMITING OF BACKGROUND TRAFFIC

CROSS-REFERENCE TO RELATED APPLICATIONS

This application is a continuation of U.S. patent application Ser. No. 11/740,918, filed on Apr. 26, 2007 and titled "End-System Dynamic Rate Limiting of Background Traffic" which claims the benefit of provisional application 60/745,736, filed on Apr. 26, 2006 and titled "Peer To Peer Download And Seed Policy Management And End-System Dynamic Rate Limiting Of Background Traffic," both of which are incorporated by reference here in their entirety.

BACKGROUND OF THE INVENTION

1. Field of the Invention

The present invention relates generally to peer-to-peer networking environments. In particular, the present invention is directed towards a system and method for adaptively rate limiting traffic in a peer-to-peer network based on network congestion.

2. Description of Background Art

A number of applications exist for exchanging files in a peer-to-peer environment. These peer-to-peer file sharing applications suffer the deserved reputation of bullying other traffic on the network. Due to difficult-to-remedy limitations in Internet congestion-control algorithms, large file downloads tend to build up a backlog inside the network. Backlogs increase delays that are most often noticed by users running interactive applications such as web browsers. The conventional approach to solving this problem has been to rate-limit peer-to-peer traffic at all times, even when no web traffic is present. This leads to an inefficient result, since if no competing traffic such as that from a web browser is present, artificially limiting the rate at which the peer-to-peer application can operate serves no purpose.

In an alternative strategy, peer-to-peer traffic is treated as background traffic. Background traffic defers to higher-priority traffic, but otherwise consumes excess capacity.

SUMMARY OF THE INVENTION

The present invention includes methods for end-systems in a peer-to-peer network to dynamically rate limit background traffic to alleviate congestion in the access network. This differs from the traditional end-to-end congestion control problem as addressed by TCP in at least three ways: 1) end-to-end congestion control measures congestion across all bottlenecks in the path even when a typical user is more motivated to protect nearby bottlenecks, e.g., his own access point; 2) end-to-end congestion control schemes typically treat all traffic equally pushing the duty of service differentiation to the underlying network; and 3) end-to-end congestion control typically controls only a single flow as opposed to the aggregate of flows sharing a bottleneck.

The present invention measures ICMP echo round-trip times and ICMP losses to a nearby node outside the local area and just beyond the divergence in end-to-end paths allowing unambiguous discrimination of nearby from distant congestion points. Using round-trip time samples, either short-run delay or short-run variance in delay can be measured to estimate congestion. When combined with an appropriate control law, background traffic can be rapidly reduced to allow interactive traffic to traverse unhindered through the access network. The present invention can be implemented in the application-layer and without any additional support from the network.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
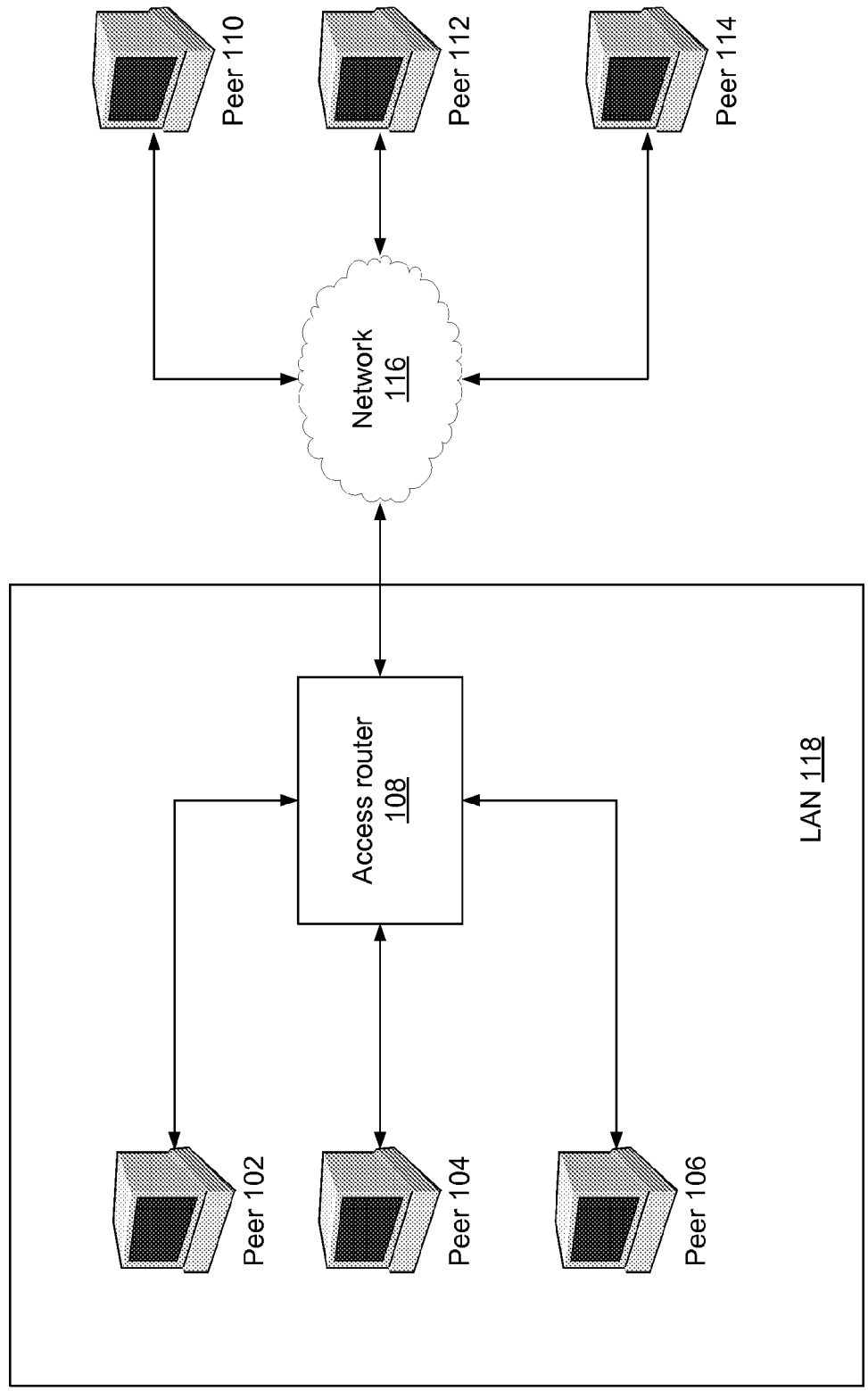
FIG. 1 is an illustration of a peer-to-peer networking environment.

FIG. 1 illustrates a context for the present invention. A network 116 such as the Internet connects remote peers 110, 112, 114 with a group of peers 102, 104, 106 on a local area network (LAN) 118. For example, peers 102, 104, 106 may be three computers in a single household, or three computers on a college campus, or three computers at a commercial location. Further, while three computers in the LAN and three remote peers are shown in FIG. 1, this is simply for purposes of illustration—an arbitrary number of peers may be involved in the peer-to-peer networking environment to which the present invention has application. Peers 102, 104, 106 communicate with network 116 via access router 108—for example, network traffic between peer 102 and peer 110 would travel through access router 108 (in addition to making several additional hops as is known in the art).

Figure 2:
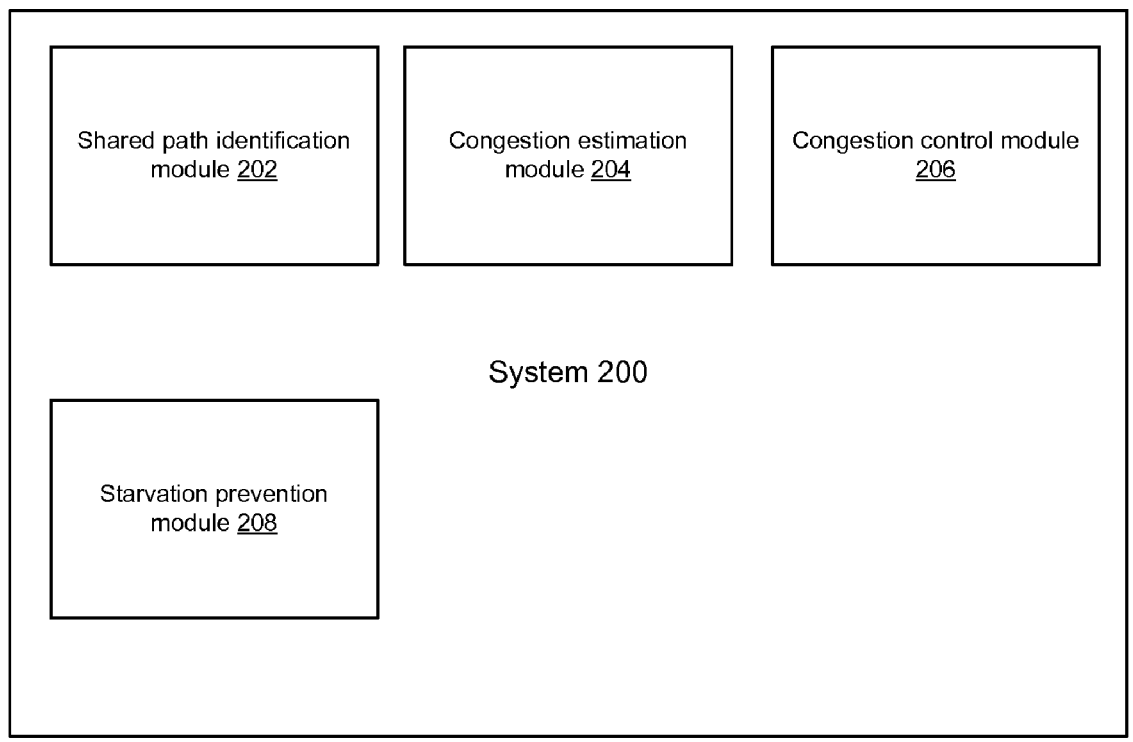
FIG. 2 is a block diagram of a system for providing adaptive rate-limiting in a peer-to-peer network in accordance with an embodiment of the present invention.

A system of the present invention in one embodiment is executed by a peer involved in peer-to-peer file sharing, as part of a file-sharing application. FIG. 2 illustrates functional components of a system 200 for providing dynamic rate limiting in accordance with an embodiment of the present invention. System 200 includes a shared path identification module 202 for detecting the location of an access router 108 is likely to be the location of a packet throughput bottleneck; a congestion estimation module 204 for estimating the level of congestion in the network by observing traffic or probing; a congestion control module 206 for applying a congestion control law to adaptively control a rate limit to which the peer-to-peer traffic is subject, thereby governing how much traffic is allowed to enter the network based on the congestion estimate; and a starvation prevention module 208 for ensuring on a longer timescale that an appropriate balance exists between peer-to-peer and other types of traffic over the network by setting a lower bound on the rate limit imposed on peer-to-peer (background) traffic and thus avoiding starvation.

Each of the modules of system 200 is described further below.

Shared Path Identification

Figure 3:
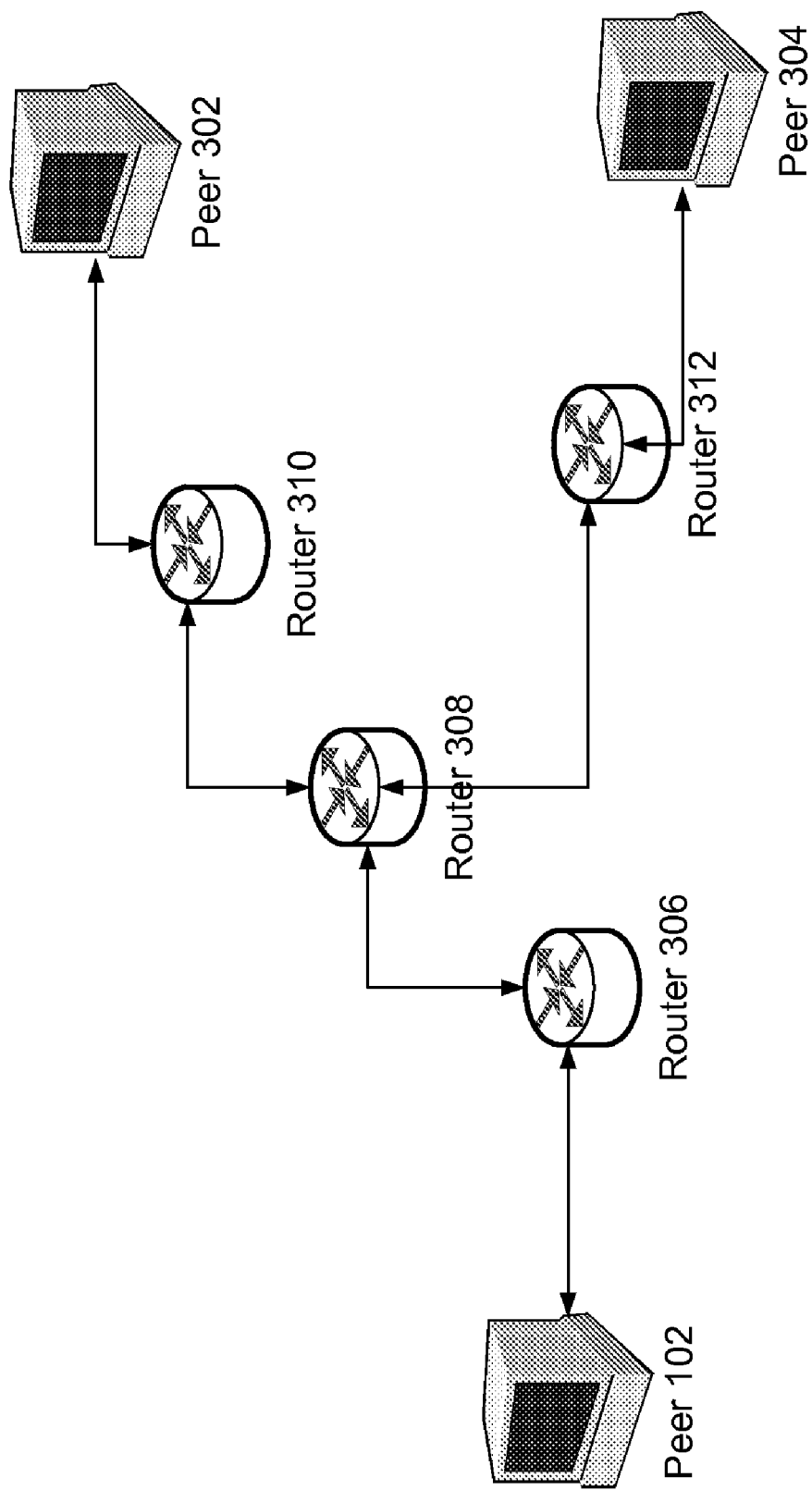
FIG. 3 illustrates the determination of a shared path in accordance with an embodiment of the present invention.

Some conventional approaches to shared path identification operate by identifying the location of access router 108 by looking for the last common node in the paths to peers. The routes are obtained by tracerouting to each new peer and updating the shared path. For example, referring to FIG. 3, a path from peer 102 to peer 302 travels via routers 306, 308 and 310. A path from peer 102 to peer 304 travels via routers 306, 308, and 312. Accordingly, the shared path includes routers 306 and 308, and the access router would be predicted to be router 308.

Shared path identification module 202, by contrast, in one embodiment ignores all connections to nodes within the same network prefix when determining the last common node.

Congestion Estimation

Once the location in the network of access router 108 has been determined, system 200 next estimates the level of congestion in the network.

Since system 200 is detecting congestion in the nearby network, it exploits two properties of such networks to improve congestion control: with high likelihood there is only one bottleneck (usually access point 108) and thus this single bottleneck can be well-characterized according to buffer size and capacity.

In one embodiment, system 200 can use two congestion estimators. A first method, auto-threshold pinging (ATP), measures congestion based on smoothed ping round-trip time, setting delay thresholds that require less sensitive input parameters than conventional methods. A second method, variance pinging (VP), eschews using smoothed round trips in favor of reacting based on variance in round-trip times.

Auto-Threshold-Pinging

Congestion estimation module 204 begins by obtaining smoothed ping round trip times. In one embodiment, the minimum round-trip time seen so far, known as base_rtt, is subtracted from the smoothed ping times to obtain an unbiased estimate of queuing delay. Alternatively, because propagation delay is likely to be miniscule compared to queuing delays, subtracting the base_rtt may have negligible effect and therefore may be skipped.

To smooth round trip estimates, congestion estimation module 204 may use exponentially weighted moving averaging (EWMA); mean over a moving window; or median over a moving window. All three techniques require one parameter: the weight for EWMA or moving window size. For all three smoothing mechanisms, performance remains good across a wide range of scenarios without modifying parameter settings, EWMA of 0.1 (smaller is slower convention) or window size of 10 samples. Prior work in congestion control has largely avoided using moving windows because of the additional state and computations involved. However, since an aggregate of all peer-to-peer connections is being controlled, these additional computations are likely to be miniscule compared to the overhead already present in the underlying TCP layer.

A single delay threshold is used in one embodiment to signal congestion. Congestion estimation module 204 stores the k-largest round trip times and uses the median of these measurements to estimate the delay that occurs when the bottleneck buffer is full or near full. This estimate, called a delay-on-full estimation, is denoted delay_on_full. In one embodiment, k can be 1, in which case the delay-on-full estimation is equivalent to using the maximum round trip time (RTT) seen so far. Median is used in one embodiment because it is less affected by outliers. When an ICMP echo loss occurs, the largest sample is dropped. Thus the delay-on-full estimate will eventually recover if it becomes far off due to spurious noise.

Once the delay-on-full estimate is made, the delay threshold (max_thresh) is set in one embodiment as follows:

$$\mathrm{max\_thresh} = \mathrm{thresh\_factor} * \mathrm{delay\_on\_full}$$

By setting max_thresh dynamically, system 200's throughput sensitivity is reduced across scenarios with different bottleneck sizes. However, larger bottleneck buffers will result in larger delays. This dynamic setting also eliminates errors found in conventional methods when the threshold is set so large that congestion is never detected, and it reduces the rate of false positives whenever there is a reasonably provisioned bottleneck buffer.

Variance Pinging

Auto-threshold pinging by itself does not explicitly take into account delay variance. Because observed round-trip time variance is high, system 200 exploits the high variance as a measure of congestion.

Queuing delay exhibits high variance, but not in the case of low or very high utilization. When the access network has low utilization, a queue is not given a chance to build. When the access network has high utilization, the buffer is not given a chance to drain. System 200 adjusts the send rate to keep the system near the point of maximum variance.

Variance var is measured across a window of the last max_samples where max_samples is in one embodiment set to 10. Whenever a ping arrives, the following is done:

```
var = measure over window
if var > max_var then max_var = var
if var > var_factor * max_var:
    network is congested
```

Max_var will tend to rise over time with noise and as a result there is concern that it might drift so high that the access network never becomes congested. However, when this occurs, the buffer will begin to overflow resulting in ping loss. When a ping is lost, congestion estimation module 204 reduces max_var by reduce_factor. In one embodiment, reduce_factor is set to 0.8.

Note that variance reduces when the bottleneck becomes near full. The described algorithm increases the send rate whenever variance is below var_factor*max_var under the assumption that variance is in the regime where it increases with send rate. As a result, the rate limit increases until the buffer overflows and pings begin to be lost. Thus in one embodiment system 200 multiplicatively backs off the rate limit whenever ping loss occurs. This multiplicative back-off is steeper than the back-off described below in order to ensure that the buffer is given a chance to drain.

Congestion Control Law

Congestion control module 206 in one embodiment uses Additive Increase with Multiplicative De-crease (AIMD) as a control law as follows:

```
if network is congested:
    rlim *= beta
else if upspeed within
        epsilon of rlim:
    rlim += delta
``` where "rlim" represents the upload rate limit, and upspeed represents.

The congested state is signaled as described above. In one embodiment, beta is set to 0.8 and delta to 1 KBps.

AIMD improves upon conventional controls for a peer-to-peer environment in that it is rate-based.

Starvation Prevention

A starvation prevention mechanism places bounds on how low congestion control module 206 rate limits a peer's background traffic. An appropriate value for the rate limit is determined by first characterizing the access network's capacity over longer time periods and then setting an appropriate bound. In one embodiment, this is done using capacity fraction starvation prevention; alternatively it is done using long-run throughput fraction starvation prevention.

Capacity Fraction Starvation Prevention

The benefit a user derives from interactive traffic and from background traffic both exhibit diminishing returns with increasing bandwidth use. More specifically, the utility functions for both interactive and background traffic are continuously differentiable, concave, and increasing. From convex optimization, under these conditions a unique solution will exist. If the utility functions are additionally logarithmic then the optimal point resides at a fraction of capacity.

Consider utility U, bitrate x allocated to foreground traffic, and bitrate y allocated to background traffic. a and b are constants denoting relative importance of foreground versus background traffic. Let c denote the access capacity:

$$\text{utility } U = a \log x + b \log y, \quad (1)$$

$$\text{maximize } U \quad (2)$$

$$\text{such that } x+y \leq c \text{ and } x,y \geq 0. \quad (3)$$

Given that utility is an increasing function of band-width, the optimum will reside along the line x+y=c. The maximal utility occurs where $$\frac{dU}{dx} = 0 = \frac{a}{x} - \frac{b}{c-x}, \quad (4)$$

which solves to $$x = \frac{a}{a+b}c, \, y = \frac{b}{a+b}c. \quad (5)$$

Thus, for a choice of utility functions, the optimum minimum background traffic rate limit occurs at a fraction of $$\frac{b}{a+b}c$$

regardless of the value of c. The capacity fraction starvation prevention building block thus takes as input a fraction cap_frac. The rate limit on background traffic is bounded such that $$r\text{lim} \geq \text{cap\_frac} \cdot \text{cap\_est}$$

where cap_est is an estimate of access capacity. A number of existing capacity estimators can be used to set cap_est. See, for example, Van Jacobson, "Pathcar, a tool to infer characteristics of internet paths," http://ftp.ee.lbl.gov/pathchar; A. Downey, "Using pathcar to estimate internet link characteristics," in *Proceedings of SIGCOMM '99* Boston, Mass., August 1999; and Robert L. Carter and Mark E. Crovella, "Measuring bottleneck link speed in packet switched networks," in *Performance Evaluation*, 1996, 27-28, pp. 297-318, all of which are incorporated by reference herein.

If the user desires emulation of high priority queuing, then this is handled as a special case. The user sets cap_frac to zero. Multiplicative decrease can get arbitrarily close to zero, unlike conventional methods which are limited by the granularity of the decrease delta.

Long-Run Throughput Fraction Starvation Prevention

Long-run throughput fraction starvation prevention is similar to capacity fraction starvation prevention building block, except that the rate limit prevented from falling below a fraction of the long-run aggregate upload rate, long_avg_uprate:

$$r\text{lim} \geq \text{cap\_frac} \cdot \text{long\_avg\_uprate}$$

This does not require a capacity estimator as required by capacity fraction starvation prevention, but using long-run throughput only prevents starvation to the extent that the throughput is averaged over a much longer time span than the timescale used by the congestion estimator building block. A long period of congestion would cause the long-run average to diminish resulting in a slow progression toward starvation.

Figure 4:
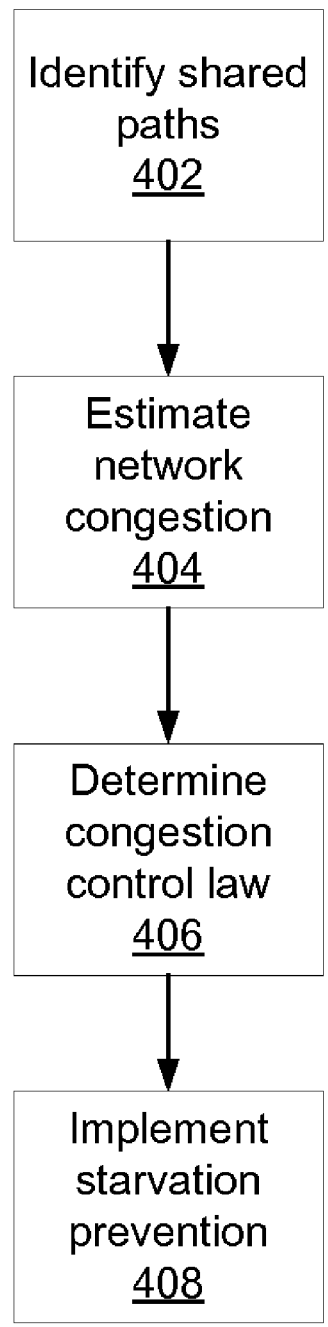
FIG. 4 is a flowchart illustrating a method for providing adaptive rate-limiting in a peer-to-peer network in accordance with an embodiment of the present invention.

Accordingly, and referring to FIG. 4, a method for dynamically rate-limiting background traffic in accordance with an embodiment of the present invention includes identifying 402 shared paths; estimating network congestion 404; determining 406 an appropriate congestion control law; and implementing 408 starvation prevention, all as described above.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of the congestion estimation module 204, congestion control module 206, and so forth may be provided in many or one module.

Some portions of the above description present the feature of the present invention in terms of algorithms and symbolic representations of operations on information. These algorithmic descriptions and representations are the means used by those skilled in the art of peer-to-peer networking to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A computer system for rate-limiting traffic in a peer-to-peer network, the computer system comprising:
   a processor; and
   a computer program product, the computer program product stored on a non-transitory computer-readable storage medium and including program code for causing the processor to execute steps comprising:
   estimating congestion in the network;
   determining a congestion control law associated with the estimated congestion, the congestion control law including a first rate limit for peer-to-peer traffic and a second rate limit for other traffic; and
   providing a bounding mechanism on the congestion control law by:
   calculating an average upload rate;
   determining a first number corresponding to the relative importance of other traffic;
   determining a second number corresponding to the relative importance of peer-to-peer traffic;
   calculating a minimum allowable rate limit as a fraction of the average upload rate, the fraction having as a numerator the second number and as a denominator the sum of the first number and the second number; and
   responsive to the determined first rate limit being below the minimum allowable rate limit, setting the first rate limit equal to the minimum allowable rate limit.

2. The computer system of claim 1, the program code further causing the process to execute the steps of:
   identifying a path in the network shared by a plurality of peers by:
   tracing at least one route from a first peer to at least one other peer, each traced route comprising one or more nodes; and
   determining a last common node, wherein the last common node is a node that is most distant from the first peer and that is common to all traced routes.

3. The computer system of claim 1 wherein the first rate limit is an upload rate limit.

4. The computer system of claim 3 wherein the first rate limit is determined using an Additive Increase with Multiplicative Decrease technique.

5. The computer system of claim 1 wherein the second rate limit is a maximum rate supported by the network.

6. The computer system of claim 1, wherein estimating congestion in the network further comprises:
   identifying a last common node within a path in the network shared by a plurality of peers;
   pinging the last common node a plurality of times to observe a plurality of round-trip times;
   calculating a delay metric corresponding to a buffer associated with the last common node being full based on a subset of observed round-trip times; and
   setting a single congestion threshold based on the delay metric.

7. The computer system of claim 1 wherein estimating congestion the network further comprises:
   identifying a last common node within a path in the network shared by a plurality of peers;
   pinging the last common node a plurality of times to observe a plurality of round-trip times;
   calculating a smoothed ping time based on the observed round-trip times;
   subtracting a minimum observed round-trip time from the smoothed ping time to calculate a queuing delay; and
   comparing the queuing delay to the delay metric.

8. The computer system of claim 7 wherein calculating a smoothed ping time further comprises calculating an exponentially weighted moving average of the observed round-trip times.

9. The computer system of claim 7 wherein calculating a smoothed ping time further comprises calculating a mean of the observed round-trip times over a moving window.

10. The computer system of claim 7 wherein calculating a smoothed ping time further comprises calculating a median of the observed round-trip times over a moving window.

11. The computer system of claim 1 wherein estimating congestion in the network further comprises:
    identifying a last common node within a path in the network shared by a plurality of peers;

pinging the last common node a plurality of times to observe a plurality of round-trip times;
calculating a variance of the observed round-trip times; and
estimating congestion based on the variance.

12. A computer system for rate-limiting traffic in a peer-to-peer network, the computer system comprising:
   a processor; and
   a computer program product, the computer program product stored on a non-transitory computer-readable storage medium and including program code for causing the processor to execute steps comprising:
      estimating congestion in the network;
      determining a congestion control law associated with the estimated congestion, the congestion control law including a first rate limit for peer-to-peer traffic and a second rate limit for other traffic; and
      providing a bounding mechanism on the congestion control law by:
         determining a capacity of the network;
         determining a first number corresponding to the relative importance of other traffic;
         determining a second number corresponding to the relative importance of peer-to-peer traffic;
         calculating a minimum allowable rate limit as a fraction of the capacity, the fraction having as a numerator the second number and as a denominator the sum of the first number and the second number; and
         responsive to the determined first rate limit being below the minimum allowable rate limit, setting the first rate limit equal to the minimum allowable rate limit.

13. The computer system of claim 12, the program code further causing the process to execute the steps of:
   identifying a path in the network shared by a plurality of peers by:
      tracing at least one route from a first peer to at least one other peer, each traced route comprising one or more nodes; and
      determining a last common node, wherein the last common node is a node that is most distant from the first peer and that is common to all traced routes.

14. The computer system of claim 12, wherein estimating congestion in the network further comprises:
   identifying a last common node within a path in the network shared by a plurality of peers;
   pinging the last common node a plurality of times to observe a plurality of round-trip times;
   calculating a delay metric corresponding to a buffer associated with the last common node being full based on a subset of observed round-trip times; and
   setting a single congestion threshold based on the delay metric.

15. The compute system of claim 12 wherein estimating congestion in the network further comprises:
   identifying a last common node within a path in the network shared by a plurality of peers;
   pinging the last common node a plurality of times to observe a plurality of round-trip times;
   calculating a smoothed ping time based on the observed round-trip times;
   subtracting a minimum observed round-trip time from the smoothed ping time to calculate a queuing delay; and
   comparing the queuing delay to the delay metric.

16. The computer system of claim 15 wherein calculating a smoothed ping time further comprises calculating an exponentially weighted moving average of the observed round-trip times.

17. The computer system of claim 15 wherein calculating a smoothed ping time further comprises calculating a mean of the observed round-trip times over a moving window.

18. The computer system of claim 15 wherein calculating a smoothed ping time further comprises calculating a median of the observed round-trip times over a moving window.

19. The computer system of claim 12 wherein estimating congestion in the network further comprises:
   identifying a last common node within a path in the network shared by a plurality of peers;
   pinging the last common node a plurality of times to observe a plurality of round-trip times;
   calculating a variance of the observed round-trip trip times; and
   estimating congestion based on the variance.

20. A method for rate-limiting traffic in a peer-to-peer network, the method comprising:
   estimating by a processor congestion in the network;
   determining by the processor a congestion control law associated with the estimated congestion, the congestion control law including a first rate limit for peer-to-peer traffic and a second rate limit for other traffic; and
   providing by the processor a bounding mechanism on the congestion control law by:
      calculating an average upload rate;
      determining a first number corresponding to the relative importance of other traffic;
      determining a second number corresponding to the relative importance of peer-to-peer traffic;
      calculating a minimum allowable rate limit as a fraction of the average upload rate, the fraction having as a numerator the second number and as a denominator the sum of the first number and the second number; and
      responsive to the determined first rate limit being below the minimum allowable rate limit, setting the first rate limit equal to the minimum allowable rate.

21. A method for rate-limiting traffic in a peer-to-peer network, the method comprising:
   estimating by a processor congestion in the network;
   determining by the processor a congestion control law associated with the estimated congestion, the congestion control law including a first rate limit for peer-to-peer traffic and a second rate limit for other traffic; and
   providing by the processor a bounding mechanism on the congestion control law by:
      calculating a capacity of the network;
      determining a first number corresponding to the relative importance of other traffic;
      determining a second number corresponding to the relative importance of peer-to-peer traffic;
      calculating a minimum allowable rate limit as a fraction of the capacity of the network, the fraction having as a numerator the second number and as a denominator the sum of the first number and the second number; and
      responsive to the determined first rate limit being below the minimum allowable rate limit, setting the first rate limit equal to the minimum allowable rate limit.

* * * * *

UNITED STATES PATENT AND TRADEMARK OFFICE
CERTIFICATE OF CORRECTION

PATENT NO. : 8,385,201 B2
APPLICATION NO. : 12/732264
DATED : February 26, 2013
INVENTOR(S) : Bram Cohen et al.

It is certified that error appears in the above-identified patent and that said Letters Patent is hereby corrected as shown below:

In the Claims

Column 8, line 44, after "congestion" insert --in--.
Column 10, line 41, after "rate" insert --limit--.

Signed and Sealed this
Thirtieth Day of July, 2013

Teresa Stanek Rea
*Acting Director of the United States Patent and Trademark Office*